US010030981B2

(12) United States Patent
Zhou

(10) Patent No.: US 10,030,981 B2
(45) Date of Patent: Jul. 24, 2018

(54) VARYING MAP INFORMATION DENSITY BASED ON THE SPEED OF THE VEHICLE

(71) Applicant: GOOGLE INC., Mountain View, CA (US)

(72) Inventor: Bailiang Zhou, Seattle, WA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/637,136

(22) Filed: Jun. 29, 2017

(65) Prior Publication Data
US 2017/0350709 A1 Dec. 7, 2017

Related U.S. Application Data

(63) Continuation of application No. 14/208,083, filed on Mar. 13, 2014, now Pat. No. 9,714,832.

(51) Int. Cl.
G06F 15/16 (2006.01)
G01C 21/26 (2006.01)
G01C 21/36 (2006.01)
G06F 17/30 (2006.01)
H04L 29/08 (2006.01)
G01C 21/32 (2006.01)

(52) U.S. Cl.
CPC ........... *G01C 21/26* (2013.01); *G01C 21/367* (2013.01); *G01C 21/3673* (2013.01); *G01C 21/3682* (2013.01); *G06F 17/30241* (2013.01); *H04L 67/22* (2013.01); *G01C 21/32* (2013.01)

(58) Field of Classification Search
CPC .. G01C 21/367; G01C 21/3682; G01C 21/26; G01C 21/32; H04L 67/22

USPC ......................................................... 709/203
See application file for complete search history.

(56) References Cited

U.S. PATENT DOCUMENTS

| 7,385,501 | B2 | 6/2008 | Miller et al. |
| 8,103,445 | B2 | 1/2012 | Smith et al. |
| 2004/0243307 | A1 | 12/2004 | Geelen |
| 2008/0051989 | A1 | 2/2008 | Welsh |
| 2008/0118051 | A1 | 5/2008 | Odinak et al. |
| 2010/0223006 | A1 | 9/2010 | Sasaki |
| 2010/0331017 | A1 | 12/2010 | Ariga |
| 2011/0172917 | A1 | 7/2011 | Muzina et al. |
| 2012/0215441 | A1 | 8/2012 | Hayakawa |
| 2012/0283946 | A1 | 11/2012 | Doan et al. |

(Continued)

FOREIGN PATENT DOCUMENTS

| EP | 1 746 560 A1 | 1/2007 |
| JP | 2002-005670 A | 1/2002 |

OTHER PUBLICATIONS

International Search Report and Written Opinion for Application No. PCT/US2015/020171, dated May 29, 2015.

(Continued)

Primary Examiner — Oleg Survillo
(74) Attorney, Agent, or Firm — Marshall, Gerstein & Borun LLP

(57) ABSTRACT

To dynamically vary map content based on the speed at which a portable device is moving, for a map in which a portable device user is following, a request for map data for a particular location is received along with an indication of the speed of the portable device. As a result, at least two versions of map data for the particular location are identified and one of the versions is selected based on the speed. The selected version is then transmitted to the portable device for display.

17 Claims, 6 Drawing Sheets

(56) References Cited

U.S. PATENT DOCUMENTS

2013/0147846 A1    6/2013    Kalai et al.
2013/0249812 A1    9/2013    Ramos et al.
2013/0322702 A1    12/2013    Piemonte et al.
2015/0095350 A1    4/2015    Chen et al.
2015/0142391 A1    5/2015    Flynn et al.
2015/0241235 A1    8/2015    Lobato Fregoso et al.

OTHER PUBLICATIONS

Office Action for U.S. Appl. No. 14/208,083, dated Feb. 12, 2016.
Office Action for U.S. Appl. No. 14/208,083, dated Jan. 31, 2017.
Office Action for U.S. Appl. No. 14/208,083, dated Jun. 16, 2016.

VARYING MAP INFORMATION DENSITY BASED ON THE SPEED OF THE VEHICLE

CROSS-REFERENCE TO RELATED APPLICATIONS

This application is a continuation of and claims priority to U.S. application Ser. No. 14/208,083, filed on Mar. 13, 2014, entitled "Varying Map Information Density Based on the Speed of the Vehicle," the entire disclosure of which is hereby expressly incorporated by reference herein.

FIELD OF THE DISCLOSURE

The present disclosure relates to digital mapping data and, more particularly, to dynamically varying map content depending on the speed of a portable device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map data for display while travelling. As a result, software applications receive map data on the fly as the user makes progress along the route.

SUMMARY

To effectively provide map data to a user, a mapping system implemented in a portable device and/or the head unit of a vehicle dynamically varies map content depending on the speed of the portable device. A server is configured to generate multiple different versions of map data so that, for example, one version contains map data represented with a certain level of detail or a certain set of visual styles, while another version contains the same map data represented with another level of detail or another set of visual styles. The server then selects one of these versions based on the speed at which the portable device is moving. In this manner, the system can make the map less cluttered when the user is not likely to be interested in some details. Moreover, this technique can improve safety during driving.

In particular, an example embodiment of the techniques of the present disclosure is a computing device including a communication interface and processing hardware coupled to the communication interface. The processing hardware is configured to: receive a map data request via the communication interface, and parse the map data request to determine a speed comprised in the map data request. The processing hardware is further configured to determine a location responsive to the map data request, identify at least two versions of map data corresponding to the location, and select, based on the speed, one of the at least two versions of the map data corresponding to the location. The processing hardware is then configured to respond to the map data request with the selected one of the at least two versions of the map data.

Another embodiment of these techniques is a portable computing device including one or more sensors configured to determine a speed of the portable device, a communication interface, and processing hardware coupled to the communication interface. The processing hardware is configured to: generate a map data request for a geographic area, determine a first speed of the portable device, and display a first version of map data corresponding to the geographic area based on the first speed. The processing hardware is further configured to determine a second speed of the portable device, and display a second version of the map data corresponding to the same geographic area based on the second speed.

Yet another embodiment of these techniques is a method for dynamically varying map content based on the speed of a portable device. The method includes receiving, at one or more computing devices, a map data request for a geographic area, and parsing, by the one or more computing devices, the map data request to determine a speed comprised in the map data request. The method further includes identifying, by the one or more computing devices, at least two versions of map data corresponding to the geographic area, and selecting, by the one or more computing devices, based on the speed, one of the at least two versions of the map data corresponding to the geographic area. Still further, the method includes responding, by the one or more computing devices, to the map data request with the selected one of the at least two versions of the map data.

DETAILED DESCRIPTION

Generally speaking, the techniques for dynamically varying map content can be implemented in a portable device, a head unit of a car, one or several network servers, or a system that includes a combination of these devices. However, for clarity, the examples below focus primarily on an embodiment in which a mapping application executes on a portable user device, generates map content using a map version engine in one or several network servers, and displays the map content on the portable device.

In one implementation, the portable device generates a request for map data for a particular geographic area, and a map version engine receives the request along with an indication of the speed of the portable device. The map version engine generates several versions of map data for the particular geographic area and sends one of the versions of the map data to the portable device based on the speed at which the portable device is moving. In some implementations, as the speed increases the map version engine selects versions of the map data with less detail and/or styling than the previous versions selected.

For example, when the user is stationary, the system generates a version of the map data with high information density, small font sizes, low contrast, etc. On the other hand, when the user is travelling at high speeds, the system generates a version of the map data with low information density, large font sizes, high contrast, etc. In addition, the system can generate several intermediate versions of map data depending on the speed of the portable device.

In other implementations, the selection of the level of detail and/or styling can be implemented on the client (the portable device or the software in the head unit).

Example Hardware and Software Components

Figure 1:
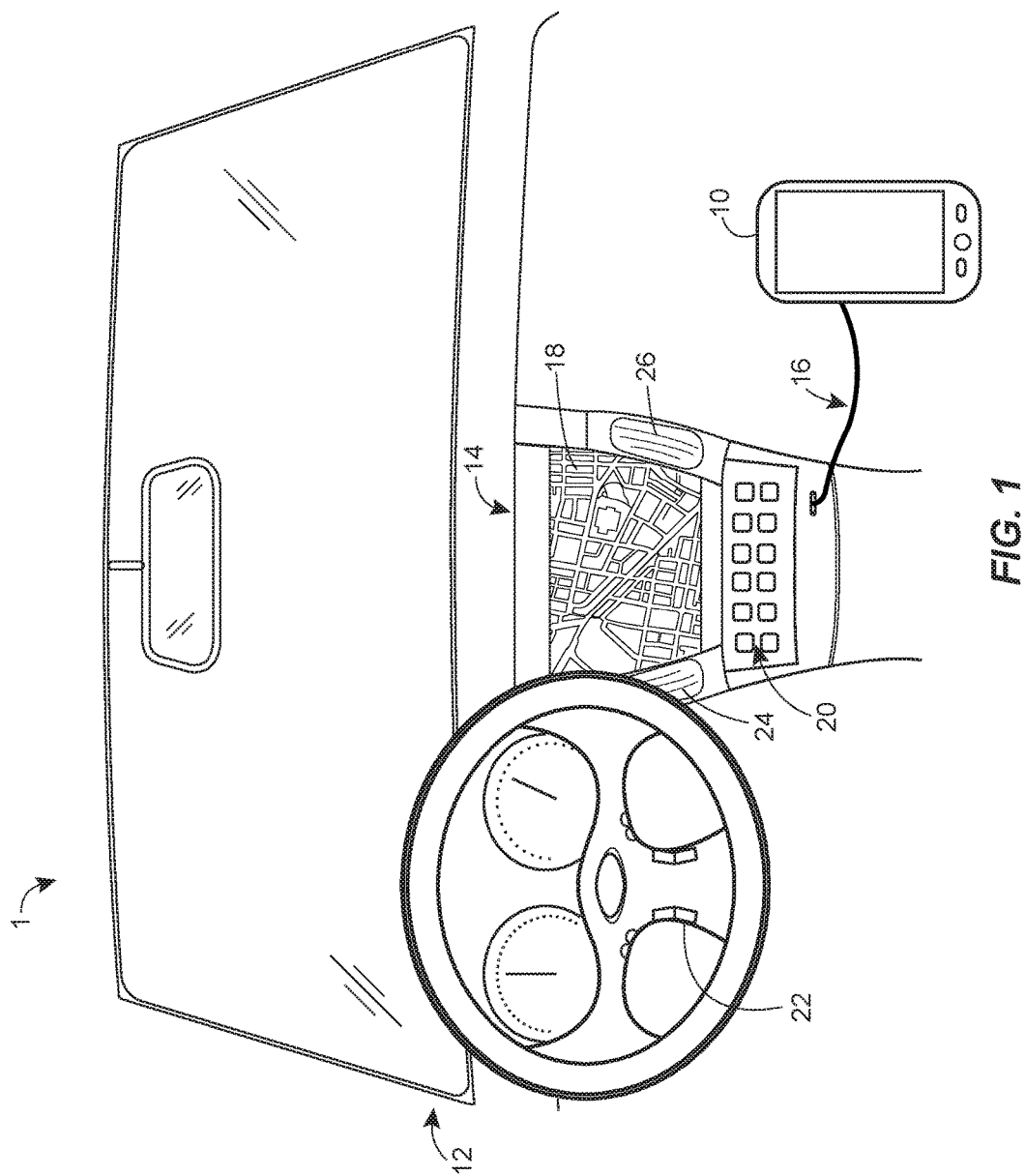
FIG. 1 illustrates an example vehicle in which the techniques of the present disclosure can be used to generate dynamic map content.

Referring to FIG. 1, an example environment 1 in which the techniques outlined above can be implemented includes a portable device 10 and a vehicle 12 with a head unit 14. The portable device 10 may be a smart phone or a tablet computer, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

The head unit 14 can include a display 18 such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play the audio instructions sent from the portable device 10.

Figure 2:
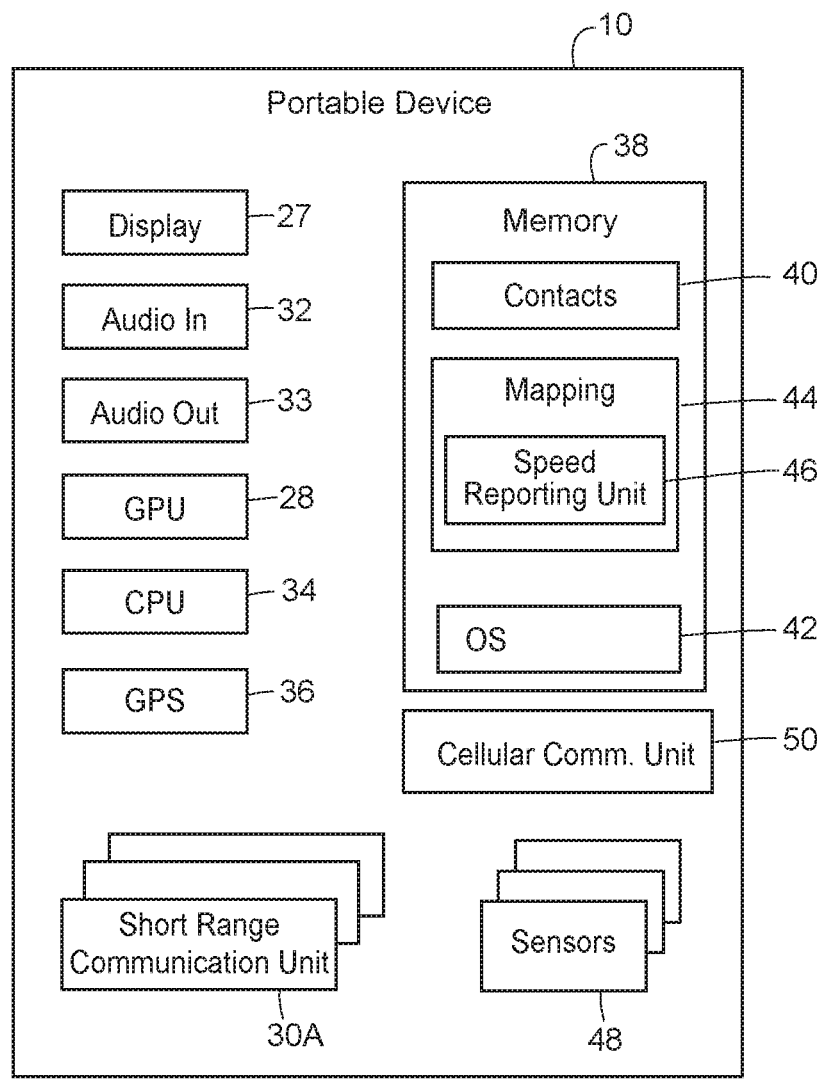
FIG. 2 is a block diagram of an example portable device that can operate in the system of FIG. 1.

An example implementation of the portable device 10 is discussed next with reference to FIG. 2. The portable device 10 can include a short-range communication unit 30A for communicating with the head unit 14 (as shown in FIG. 1). The short-range communication unit 30 can support one or more communication schemes such as USB, Bluetooth, Wi-Fi Direct, etc. The portable device 10 can include a display 27 such as a touchscreen, and audio input and output components such as a microphone 32 and speakers 33. Additionally, the portable device 10 includes a graphics processing unit (GPU) 28, one or more processors or CPUs 34, a GPS module 36, a memory 38, and a cellular communication unit 50 to transmit and receive data via a 3G cellular network, a 4G cellular network, or any other suitable network. The portable device 10 can also include sensors 48 (e.g., an accelerometer, a gyrometer, an inertial measurement unit (IMU), a speedometer). In one implementation, to improve accuracy during real-time navigation, the portable device 10 relies on the positioning data supplied by the head unit 14 (as shown in FIG. 1), rather than on the output of the GPS module 36. The portable device 10 can also rely on the speed and direction data supplied by the head unit 14, rather than on the output of the sensors 48.

The memory 38 can store, for example, contacts 40 and other personal data of the driver. As illustrated in FIG. 2, the memory also can store instructions of an operating system 42, and a speed reporting unit 46 as part of a mapping application 44 that invokes a mapping API during operation. The speed reporting unit 46 can determine the speed at which the portable device is moving using the sensors 48, or alternatively can determine the speed using speed data supplied by the head unit 14, and can report an indication of the speed to a map version engine. The speed at which the portable device 10 is moving can be related to, for example, the user's walking speed, the user's biking speed, the user's travelling speed in a vehicle, etc.

The software components 42, 44, and 46 can include compiled instructions and/or instructions in any suitable programming language interpretable at runtime. In any case, the software components 42, 44, and 46 execute on the one or more processors 34.

The mapping application 44 generally can be provided in different versions for different respective operating systems. For example, the maker of the portable device 10 can provide a Software Development Kit (SDK) including the mapping application 44 for the Android™ platform, another SDK for the iOS™ platform, etc.

Figure 3A:
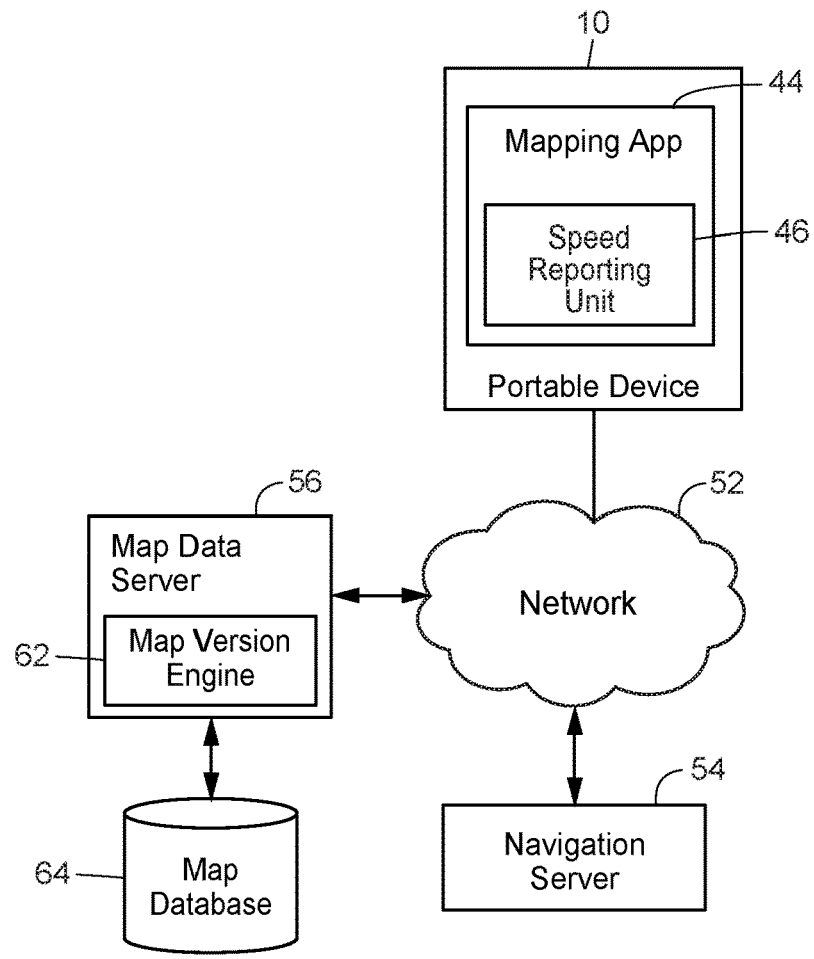
FIG. 3A is a block diagram of an example communication system in which the portable device of FIG. 2 can operate.

FIG. 3A illustrates an example communication system in which the portable device 10 can operate to obtain map data either automatically or in response to user requests submitted via the head unit 14 (as shown in FIG. 1) or the portable device 10. For ease of illustration, the portable device 10 is illustrated in FIG. 3A in a simplified manner, i.e., without some of the components illustrated in FIG. 2 and/or discussed elsewhere in this disclosure.

The portable device 10 has access to a wide area communication network 52 such as the Internet via a long-range wireless communication link (e.g., a cellular link). Referring back to FIG. 2, the portable device 10 can access the communication network 52 via a cellular communication unit 50. In the example configuration of FIG. 3A, the portable device 10 communicates with a navigation server 54 that provides navigation data and a map data server 56 in which a map version engine 62 generates several versions of map data (e.g., in a vector graphics format), and selects one of the versions for display on the portable device 10 or on the head unit display 18 (as shown in FIG. 1). To generate the several versions of map data, the map version engine 62 receives map data for a particular geographic area from a map database 64 which stores map data for the world.

More generally, the portable device 10 can communicate with any number of suitable servers. For example, in another embodiment, a traffic data server provides traffic updates along the route, a weather data server provides weather data and/or alerts, etc.

Figure 3B:
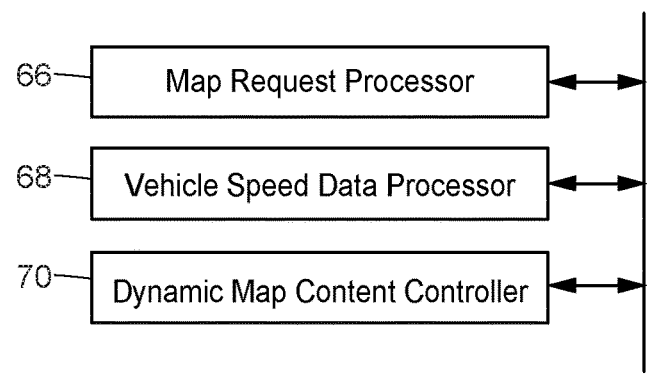
FIG. 3B is a block diagram of a component of the system of FIG. 3A for generating dynamic map content.

FIG. 3B illustrates the map version engine 62 in more detail. According to an embodiment, the map version engine 62 may include a map request processor 66 communicatively coupled to a vehicle speed data processor 68 and a dynamic map content controller 70. After the map request processor 66 receives a request for map data to display a map for a geographic area, the map request processor 66 may execute a function call to the dynamic map content controller 70 to retrieve map data from the map database 64 for the requested geographic area. The dynamic map content controller 70 may include instructions to generate the map data as a set of map tile descriptors, such that each map tile descriptor describes a map tile. The size of a geographic area represented by an individual map tile depends on the zoom level with which the map tile is associated, so that a single map tile at a lower zoom level illustrates a larger geographic area than a single map tile at a higher zoom level. The dynamic map content controller 70 may generate each map tile descriptor according to a vector graphics format.

Based on the retrieved map data, the dynamic map controller 70 may generate several versions of the map for the requested geographic area. For example, in one version the dynamic map controller 70 may include a lower level of detail for the geographic area than was retrieved from the map database 64. In another version, the dynamic map controller 70 may alter the visual styles for the geographic area. More specifically, at a lower level of detail, the dynamic map controller 70 may omit an indication of a geographic feature type which is included in the map data at a higher level of detail. Geographic feature types may include small roads, major roads, highways, public transportation hubs, airports, points of interest (POIs), etc. Additionally, at a lower level of detail, the dynamic map controller 70 may enlarge or highlight an indication of a geographic type. In some embodiments, the dynamic map controller 70 may alter an indication of an individual geographic feature such as Willis Tower, and omit the indication of the feature, enlarge or highlight it or include it when it is not included in the map data at a higher level of detail. The several versions are illustrated in more detail below in FIGS. 4A and 4B.

To determine which version of dynamic map content to render on the map, the map request processor 66 may execute a function call to the speed data processor 68 to receive an indication of the speed of the portable device 10 from the speed reporting unit 46 in the portable device 10. The speed data processor 68 may also determine an appropriate speed interval corresponding to the received indication of the speed.

For example, if the dynamic map controller 70 generates N versions of the map for the requested geographic area, the speed data processor 68 may group the received speed indications into N speed intervals. Interval 1 may be from 0 to a first predetermined threshold value in miles per hour. Interval 2 may be from a first predetermined threshold value to a second predetermined threshold value, etc.

The dynamic map content controller 70 may receive the speed interval from the speed data processor 68 and select a version of the map corresponding to the speed interval. For example, if the received speed indication is within Interval 1, the dynamic map controller 70 may select a first version of the map. If the received speed indication is within Interval 2, the dynamic map controller 70 may select a second version of the map and so on. In some embodiments, the dynamic map controller 70 does not select a version of the map based on the speed interval and instead selects a version of the map based on the speed alone.

In one embodiment, as the speed of the portable device increases, the dynamic map controller 70 selects versions of the map data which contain less detail than the previous versions. In this way, a user of the portable device moving at a fast pace may be able to read the map more clearly. Conversely, as the speed of the portable device decreases, the dynamic map controller 70 selects versions of the map data which contain more detail than the previous versions.

According to an example scenario, a user requests map data by opening a mapping application on the portable device or by activating appropriate controls on the portable device to select a viewport for a geographic area. When the user opens the mapping application, map data may be requested for a geographic area corresponding to the user's current location. The portable device then requests map data from a map data server for the requested geographic area and also sends the map data server an indication of the speed of the portable device. Referring to FIG. 3A to illustrate a more specific example, a speed reporting unit 46 within the mapping application 44 invokes the mapping API to provide the speed of the portable device 10 to the map data server 56. The map data server 56 then sends a version of the map data in a vector graphics format to the mapping application 44 in the portable device 10. The portable device 10 displays the map data on a display 27 (as shown in FIG. 2).

In some embodiments, the map data server 56 or another server provides a set of instructions that implement the mapping API to the portable device 10. The mapping API can be invoked by the mapping application 44, which can be a special-purpose mapping application, a web browser, or any other application.

However, this is merely one example embodiment. In another embodiment, the portable device 10 may receive map data for a geographic area from the map data server 56 in a vector graphics format without receiving a version of the map data to display. The portable device 10 may then generate several versions of map data for the geographic area by receiving an indication from the map data server 56 of which geographic feature types in the geographic area are of high importance. In some versions of the map data, the portable device may only include those geographic feature types which are of the highest importance, while in other versions, the portable device may include all geographic feature types in the geographic area regardless of their importance. One version of the map data may be selected from the several versions based on the speed at which the portable device is moving, and once the version is selected, the version of the map data can be displayed.

Figure 4A:
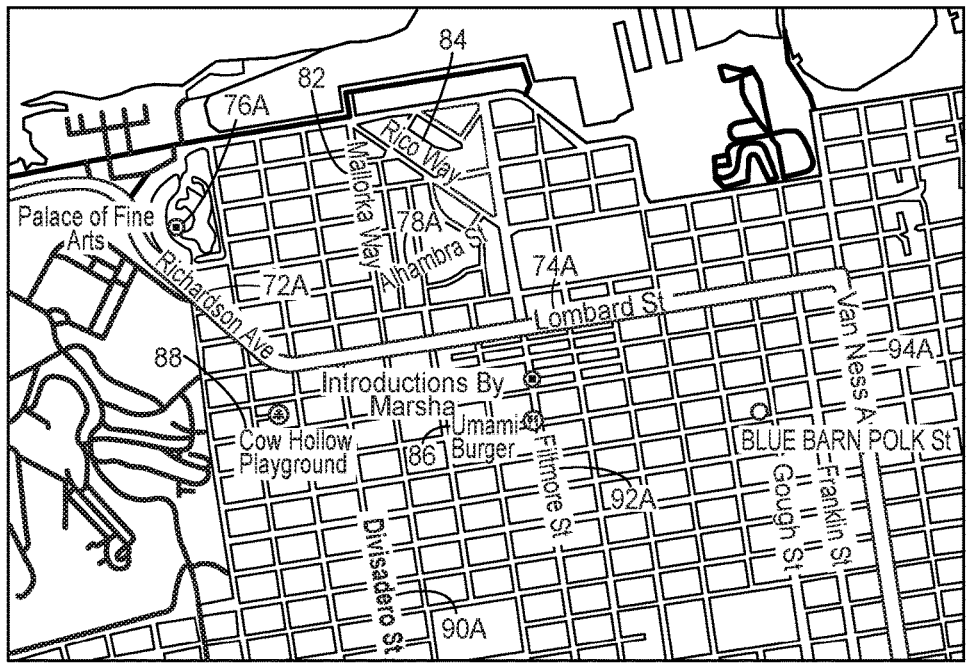
FIG. 4A is an exemplary display of map content for a geographic area at a first level of detail.
Figure 4B:
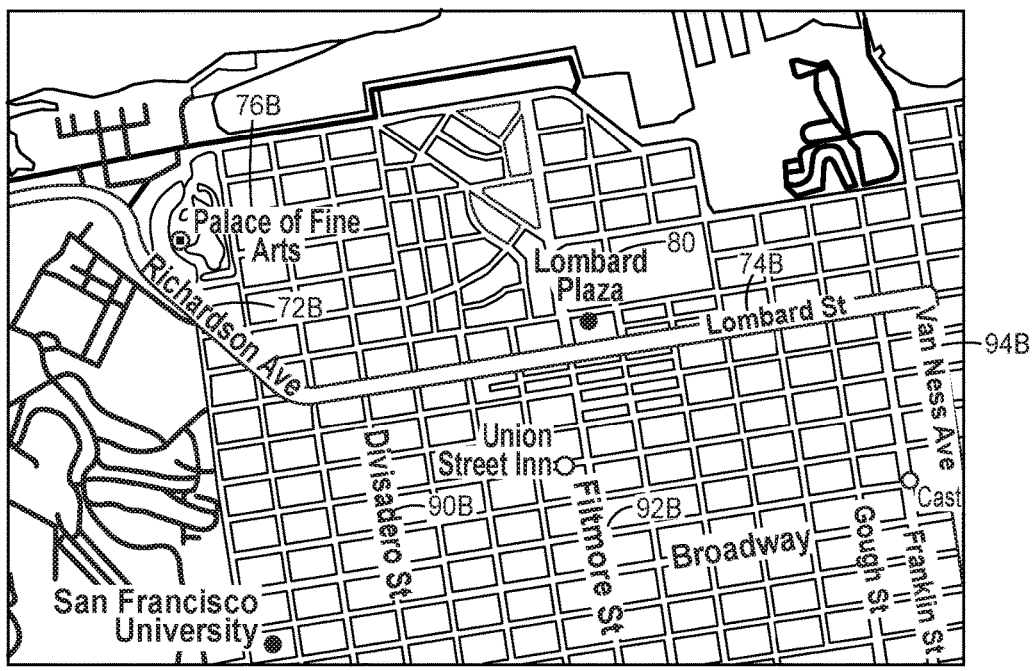
FIG. 4B is an exemplary display of map content for the same geographic area as in FIG. 4A at a second level of detail.

FIGS. 4A and 4B illustrate example versions of map data for the same geographic area and the same zoom level at two different levels of detail. In one embodiment, the portable device is stationary when the map version of FIG. 4A is displayed. By contrast, the portable device is travelling at high speeds when the map version of FIG. 4B is displayed. In particular, FIG. 4A illustrates an example version of map data for a geographic area at a high level of detail. The map displays indications of small roads in a small font such as Alhambra Street 78, Mallorca Way 82 and Rico Way 84. The map also displays indications of POIs in a larger font such as the Palace of Fine Arts 76A, Umami Burger 86 and Cow Hollow Playground 88. In addition, the map displays indications of major streets in a larger font than the small roads such as Divisadero Street 90A, Fillmore Street 92A. The map also displays indications of highways such as US 101 which includes Richardson Avenue 72A, Lombard Street 74A, and Van Ness Avenue 94A, in the same font as the major streets, but highlights the highway in a different color than the major streets.

By comparison, the example version of map data in FIG. 4B which is for the same geographic area as in FIG. 4A does not include indications of small roads such as Alhambra Street 78, Mallorca Way 82 and Rico Way 84. The map only includes some of the POIs such as the Palace of Fine Arts 76B, and in a much larger font than in the version of FIG. 4A. Moreover, some POIs such as Lombard Plaza 80 which are not included in FIG. 4A are included in the map version of FIG. 4B. This may be because Lombard Plaza 80 is identified as an important landmark for drivers even though it is not included in the map of FIG. 4A. Additionally, the indications of major streets and highways are displayed in the map of FIG. 4B, but in a much larger font and in bold, such as Richardson Avenue 72B, Lombard Street 74B, Divisadero Street 90B, Fillmore Street 92B and Van Ness Avenue 94B.

However, this is merely one example of two versions of map data for a particular geographic area. While the two versions in FIGS. 4A and 4B differ because some indications of geographic features are not included in both versions, and the font size differs between the two versions there are many other ways in which to generate multiple versions of map data for a particular geographic area. For example, the visual styles may differ for a geographic feature between two versions of map data for the same geographic area. More specifically, in a first version the font type and font color, for example, may be different for an indication of a small road than the font type and font color for the same indication of the small road in a second version. This may allow for a sharper contrast between the indication and the background in one of the versions. Additionally, more than two versions of map data may be generated for a geographic area.

Figure 5:
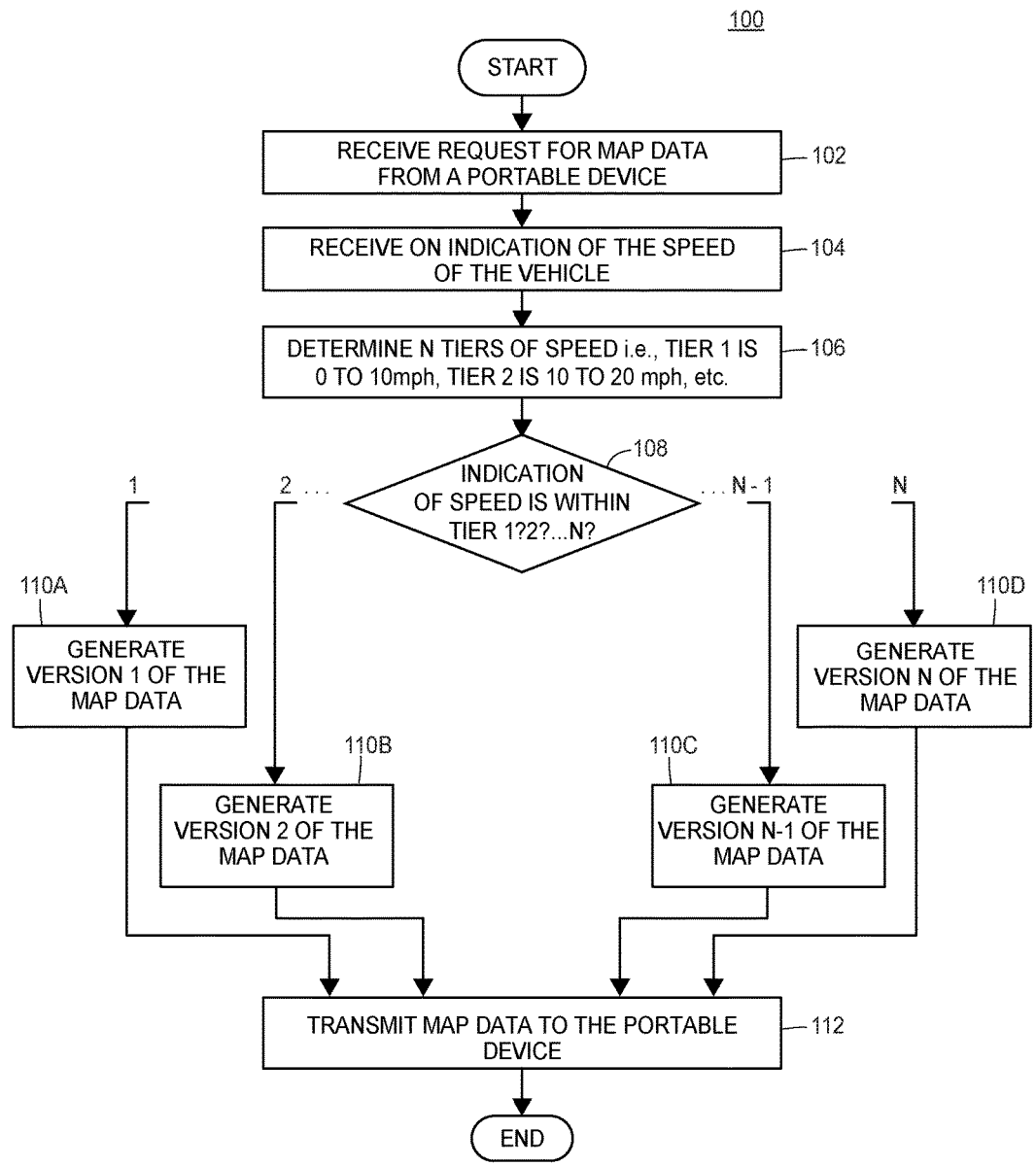
FIG. 5 is a flow diagram of an example method for generating dynamic map content at the map data server.

FIG. 5 illustrates a flow diagram of an example method 100 for generating dynamic map content at the map data server. At block 102 the map data server receives a request for map data for a particular geographic area from a portable device. The map data server also receives an indication of the speed of the portable device (block 104). In response, the map data server generates N versions of map data for the same geographic area (block 105). Then, several intervals of speed are determined up to Interval N (block 106). For example, if N is 2 then Interval 1 may range from 0 to a predetermined threshold value in miles per hour. Consequently, Interval 2 may include any speed at or above the predetermined threshold value. The map data server then determines which interval the speed belongs to and selects a version of the map data corresponding to the speed interval (block 108). For example, if the map data server determines the speed is within Interval N, then version N of the map data is selected (block 110D). The selected version is then transmitted to the portable device for display (block 112).

Figure 6:
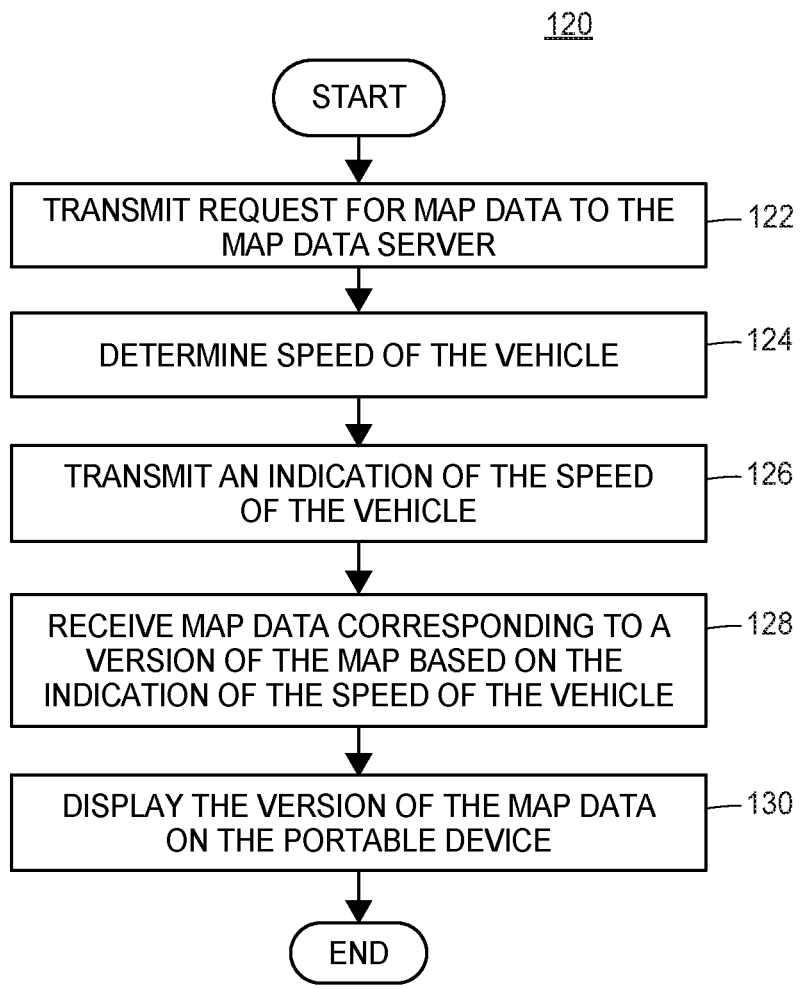
FIG. 6 is a flow diagram of an example method for displaying dynamic map content at the client device.

FIG. 6 illustrates an example method 120 for displaying dynamic map content at the portable device. At block 122 the portable device transmits a request for map data for a particular geographic area to the map data server. In addition to the request, the speed of the portable device is determined (block 124) and an indication of the speed is transmitted to the map data server (block 126). As a result, the portable device receives a version of map data for the particular geographic area based on the indication of the speed (block 128), and displays the version of map data on the portable device (block 130).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for varying the level of map detail based on the speed of a portable device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for dynamically varying map content based on the speed of a portable device, the method comprising:
   generating, by the one or more processors, a map data request for a geographic area;
   receiving, from a remotely located server, map data corresponding to the geographic area;
   determining, by the one or more processors, a speed of the portable device;
   when the speed is below a predetermined threshold value:
      generating, by the one or more processors, a first version of the map data corresponding to the geographic area, the first version including a geographic feature; and
      displaying, by the one or more processors, the first version of map data corresponding to the geographic area;
   when the speed is equal to or above the predetermined threshold value:
      generating, by the one or more processors, a second version of the map data corresponding to the same geographic area, the second version omitting the geographic feature, wherein the second version is for a same zoom level as the first version and includes a different amount of detail; and displaying, by the one or more processors, the second version of the map data corresponding to the same geographic area.

2. The method of claim 1, wherein generating the first and second versions of the map data includes:

receiving, from the remotely located server, map data corresponding to the geographic area including for each of a set of geographic features within the geographic area, receiving a level of importance for displaying the geographic feature, generating, by the one or more processors, the first version of map data including a first subset of the set of geographic features having respective levels of importance ranked above a first threshold level; and generating, by the one or more processors, the second version of map data including a second subset of the set of geographic features having respective levels of importance ranked above a second threshold level, the second threshold level higher than the first threshold level.

3. The method of claim 1, wherein generating the first and second versions of the map data includes:

generating the first version of the map data, the first version including a first font size for a set of geographic features; and generating the second version of the map data, the second version including a second font size for a same set of geographic features, wherein the second font size is larger than the first font size.

4. The method of claim 1, wherein generating the first and second versions of the map data includes:

generating the first version of the map data, the first version including a set of geographic features at a first level of detail; and generating the second version of the map data, the second version including the set of geographic features at a second level of detail, the second level of detail being lower than the first level of detail.

5. The method of claim 1, wherein generating the first and second first versions of the map data includes:

generating the first version of the map data, the first version including a set geographic features generated using a first set of visual styles; and generating the second version of the map data, the second version including the set of geographic features generated using a second set of visual styles, the second set of visual styles being different than the first set of visual styles.

6. The method of claim 1, further comprising invoking an application programming interface (API) to provide the map data request to the remotely located server.

7. A portable device comprising:

one or more sensors configured to determine a speed of the portable device;

a communication interface; and processing hardware coupled to the communication interface, the processing hardware configured to:

generate a map data request for a geographic area, receive, from a remotely located server, map data corresponding to the geographic area, determine a speed of the portable device, when the speed is below a predetermined threshold value, generate a first version of the map data corresponding to the geographic area, the first version including a geographic feature, and display the first version of map data corresponding to the geographic area, when the speed is equal to or above the predetermined threshold value, generate a second version of the map data corresponding to the same geographic area, the second version omitting the geographic feature, wherein the second version is for a same zoom level as the first version and includes a different amount of detail, and display the second version of the map data corresponding to the same geographic area.

8. The portable device of claim 7, wherein to generate the first and second versions of the map data, the processing hardware is configured to:

receive map data corresponding to the geographic area including for each of a set of geographic features within the geographic area, receive a level of importance for displaying the geographic feature, generate the first version of map data including a first subset of the set of geographic features having respective levels of importance ranked above a first threshold level; and generate the second version of map data including a second subset of the set of geographic features having respective levels of importance ranked above a second threshold level, the second threshold level higher than the first threshold level.

9. The portable device of claim 7, wherein to generate the first and second versions of the map data, the processing hardware is configured to:

generate the first version of the map data, the first version including a first font size for a set of geographic features; and generate the second version of the map data, the second version including a second font size for a same set of geographic features, wherein the second font size is larger than the first font size.

10. The portable device of claim 7, wherein to generate the first and second versions of the map data, the processing hardware is configured to:

generate the first version of the map data, the first version including a set of geographic features at a first level of detail; and generate the second version of the map data, the second version including the set of geographic features at a second level of detail, the second level of detail being lower than the first level of detail.

11. The portable device of claim 7, wherein to generate the first and second versions of the map data, the processing hardware is configured to:

generate the first version of the map data, the first version including a set geographic features generated using a first set of visual styles; and generate the second version of the map data, the second version including the set of geographic features generated using a second set of visual styles, the second set of visual styles being different than the first set of visual styles.

12. The portable device of claim 7, wherein the processing hardware is further configured to invoke an application programming interface (API) to provide the map data request to the remotely located server.

13. A non-transitory computer-readable medium storing instructions for dynamically varying map content based on the speed of a portable device that, when executed by one or more processors in the portable device, cause the one or more processors to:
  generate a map data request for a geographic area,
  receive, from a remotely located server, map data corresponding to the geographic area,
  determine a speed of the portable device,
  when the speed is below a predetermined threshold value,
    generate a first version of the map data corresponding to the geographic area, the first version including a geographic feature, and
    display the first version of map data corresponding to the geographic area,
  when the speed is equal to or above the predetermined threshold value,
    generate a second version of the map data corresponding to the same geographic area, the second version omitting the geographic feature, wherein the second version is for a same zoom level as the first version and includes a different amount of detail, and
    display the second version of the map data corresponding to the same geographic area.

14. The computer-readable medium of 13, wherein to generate the first and second versions of the map data, the instructions cause the one or more processors to:
  receive map data corresponding to the geographic area including for each of a set of geographic features within the geographic area, receive a level of importance for displaying the geographic feature,
  generate the first version of map data including a first subset of the set of geographic features having respective levels of importance ranked above a first threshold level; and
  generate the second version of map data including a second subset of the set of geographic features having respective levels of importance ranked above a second threshold level, the second threshold level higher than the first threshold level.

15. The computer-readable medium of 13, wherein to generate the first and second versions of the map data, the instructions cause the one or more processors to:
  generate the first version of the map data, the first version including a first font size for a set of geographic features; and
  generate the second version of the map data, the second version including a second font size for a same set of geographic features, wherein the second font size is larger than the first font size.

16. The computer-readable medium of 13, wherein to generate the first and second versions of the map data, the instructions cause the one or more processors to:
  generate the first version of the map data, the first version including a set of geographic features at a first level of detail; and
  generate the second version of the map data, the second version including the set of geographic features at a second level of detail, the second level of detail being lower than the first level of detail.

17. The computer-readable medium of 13, wherein to generate the first and second first versions of the map data, the instructions cause the one or more processors to:
  generate the first version of the map data, the first version including a set geographic features generated using a first set of visual styles; and
  generate the second version of the map data, the second version including the set of geographic features generated using a second set of visual styles, the second set of visual styles being different than the first set of visual styles.

* * * * *